United States Patent
Behrens et al.

(10) Patent No.: US 11,230,438 B2
(45) Date of Patent: Jan. 25, 2022

(54) POUCH CONVEYOR BELT

(71) Applicant: ContiTech Transportbandsysteme GmbH, Hannover (DE)

(72) Inventors: Carsten Behrens, Bilshausen (DE); Olaf Kluth, Hannover (DE); Jens Schlomski, Duderstadt (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 17/008,660

(22) Filed: Sep. 1, 2020

(65) Prior Publication Data

US 2020/0399073 A1    Dec. 24, 2020

Related U.S. Application Data

(63) Continuation of application No. 16/603,428, filed as application No. PCT/EP2018/052464 on Feb. 1, 2018, now Pat. No. 10,793,370.

(30) Foreign Application Priority Data

Apr. 7, 2017  (DE) ..................... 10 2017 205 961.3

(51) Int. Cl.
*B65G 43/02* (2006.01)
*B65G 15/08* (2006.01)
*B65G 15/34* (2006.01)
*B65G 15/40* (2006.01)

(52) U.S. Cl.
CPC ............. *B65G 43/02* (2013.01); *B65G 15/08* (2013.01); *B65G 15/34* (2013.01); *B65G 15/40* (2013.01); *B65G 2203/0266* (2013.01); *B65G 2203/045* (2013.01); *B65G 2203/046* (2013.01)

(58) Field of Classification Search
CPC ........ B65G 15/08; B65G 15/34; B65G 15/40; B65G 43/02
USPC .................. 198/715, 810.01, 810.02, 810.03
See application file for complete search history.

(56) References Cited

U.S. PATENT DOCUMENTS

| | | | |
|---|---|---|---|
| 4,296,855 A | 10/1981 | Blalock | |
| 4,915,213 A | 4/1990 | Loodberg et al. | |
| 8,397,904 B2 | 3/2013 | Bogle | |
| 9,004,271 B2 | 4/2015 | Fourney | |
| 9,016,458 B2 | 4/2015 | Bogle | |
| 9,315,333 B2 | 4/2016 | DePaso | |
| 10,106,324 B2 | 10/2018 | Menke et al. | |
| 10,150,622 B1 | 12/2018 | Wallace et al. | |
| 10,793,370 B2* | 10/2020 | Behrens | B65G 43/02 |

(Continued)

FOREIGN PATENT DOCUMENTS

DE    4444263 C1    5/1996
DE    19525326 C1   10/1996
(Continued)

*Primary Examiner* — Douglas A Hess
(74) *Attorney, Agent, or Firm* — Gregory Adams; David L. Cate

(57) ABSTRACT

The present invention relates to a pouch conveyor belt with a conveyor belt body, preferably an elastomer conveyor belt body, which is designed to hold a conveyed material in the interior of the closed pouch conveyor belt. The pouch conveyor belt is characterized in that the conveyor belt body comprises at least one sensor element which is configured to detect at least the temperature of the conveyor belt body at the location of the sensor element.

20 Claims, 4 Drawing Sheets

(56) References Cited

U.S. PATENT DOCUMENTS

| | | | |
|---|---|---|---|
| 10,889,443 B2 * | 1/2021 | Behrens | ................ B65G 15/08 |
| 2012/0012443 A1 | 1/2012 | Sakaguchi | |
| 2015/0075950 A1 | 3/2015 | Ellegaard et al. | |
| 2018/0354726 A1 | 12/2018 | Kleczewski | |

FOREIGN PATENT DOCUMENTS

| | | |
|---|---|---|
| DE | 19713560 A1 | 12/1998 |
| DE | 19902508 A1 | 8/2000 |
| DE | 102005037117 A1 | 5/2006 |
| DE | 202014010433 U1 | 7/2015 |
| DE | 102014109284 A1 | 1/2016 |
| EP | 0286637 A1 | 10/1988 |
| WO | 0021865 A1 | 4/2000 |
| WO | 03093149 A1 | 11/2003 |
| WO | 2016000876 A1 | 1/2016 |

* cited by examiner

POUCH CONVEYOR BELT

BACKGROUND OF THE INVENTION

The present invention relates to a pouch conveyor belt and also to a pouch conveyor belt system with such a pouch conveyor belt.

DETAILED DESCRIPTION

Figure 1:
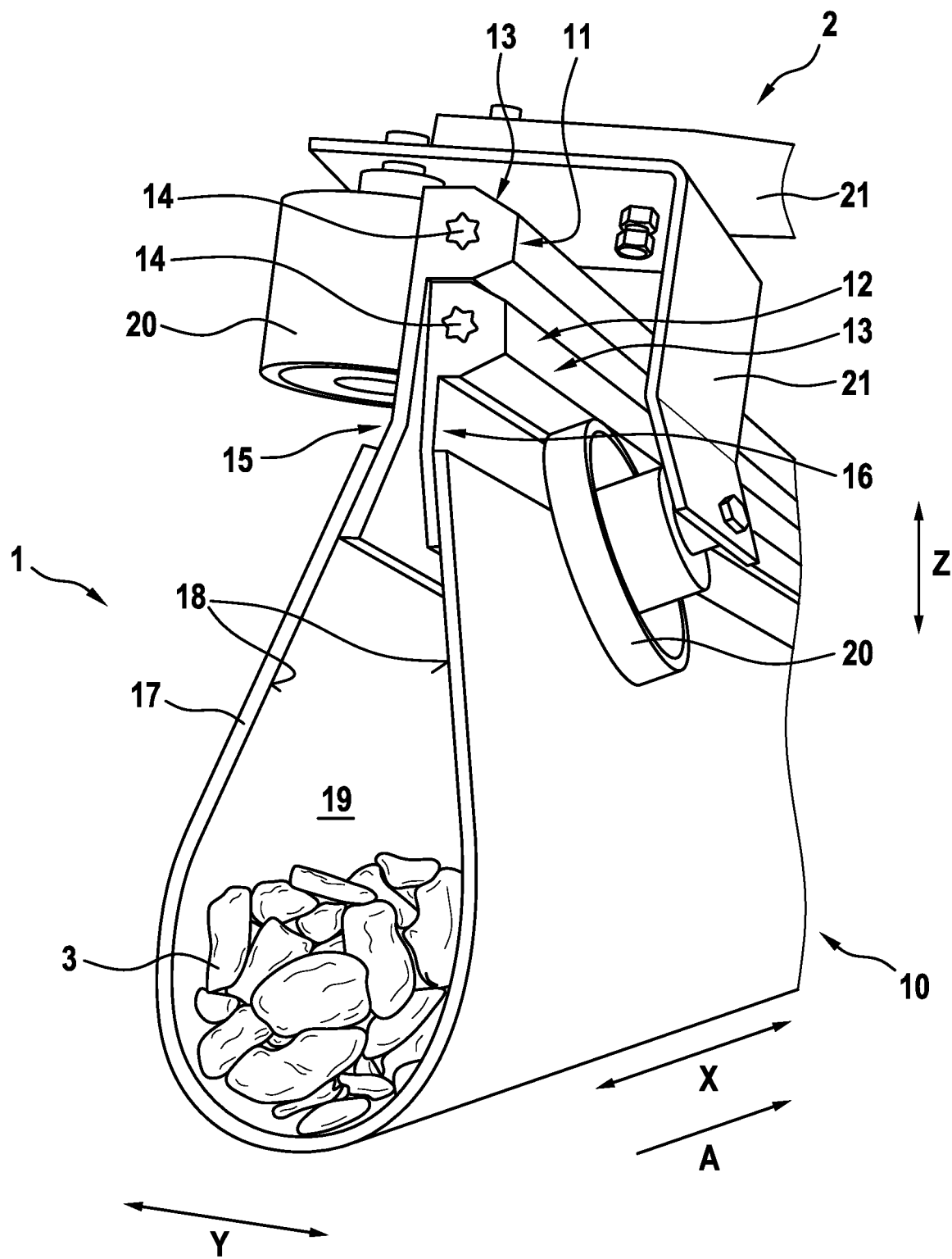
FIG. 1 shows a perspective, diagrammatic, cross-sectional depiction of a known pouch conveyor belt system with a known pouch conveyor belt.

In the field of conveying technology, a conveyor belt type called SICON® is known which is described for example in EP 0 286 637 B1. A SICON conveyor belt has two steel cables as tension members in the longitudinal direction, i.e. in the movement direction of the conveyor belt, each of which is vulcanized into the two side edge regions in the longitudinal direction. The edge regions may be known as conveyor belt edges which are guided one above the other in operation in the closed state of the SICON conveyor belt. The two edge regions have profiles around the steel cables which may be guided substantially jointly by corresponding rollers of a conveyor belt system, so that the conveyor belt can be held hanging downward. The function of these rollers is to guide the edge regions towards each other and press them against each other, so they may also be known as running rollers, guide rollers or tensioning rollers. In some cases, some or all rollers may also be driven in order to move the SICON conveyor belt in the conveying direction.

In this way, for closed transport of loose conveying material, a SICON conveyor belt may be folded up in the manner of a pouch, so that the two edge regions can be guided lying one above the other. The surface of the SICON conveyor belt lying in between thus hangs freely downward and carries the conveying material enclosed therein. A SICON conveyor belt may therefore also be described as a pouch conveyor belt or pouch conveyor. The SICON conveyor belt may be opened and closed at the input and output locations by corresponding guides.

In SICON conveyor belts, it is advantageous that the SICON conveyor belt or corresponding SICON conveyor belt system takes up little space and may therefore be used in constricted situations. This also applies to overcoming height differences in constricted situations. Normally, height differences with gradients of up to around 35° may be overcome by a SICON conveyor belt closed in the manner of a pouch, wherein the conveyor belt is compressed inside the pouch or bag and may thereby be held by force fit.

In intensive operation of a SICON conveyor belt system under high load, a temperature increase may occur in the SICON conveyor belt, in particular in the area of the edge regions which are contacted and pressed together by the rollers of the SICON conveyor belt system. This heating may be generated by pressure, friction, heat transmission from the bulk product and/or by radiant heat from the environment. This may be the case in particular if the roller setting is not optimal, and/or the rollers have mechanical damage which may lead to increased running resistance of the roller and hence to local failure of the rolling load transfer (weight of belt and conveyed product) into the supporting unit.

This temperature rise should be considered disadvantageous since it may stress the conveyor belt, which can lead to increased wear and premature ageing of the conveyor belt. This may also apply if a conveyor belt is loaded from a standstill to operating load within a short period at low temperatures.

An object of the present invention is to provide a pouch conveyor belt or pouch conveyor belt system of the kind described at the outset, so that a temperature rise of the pouch conveyor belt can be avoided or at least reduced. At least, an alternative pouch conveyor belt or alternative pouch conveyor belt system is provided.

According to the invention, the object is achieved by a pouch conveyor belt. Advantageous developments are described in the dependent claims.

The present invention thus relates to a pouch conveyor belt with a conveyor belt body, preferably an elastomer conveyor belt body, which is designed to hold a conveyed material in the interior of the closed pouch conveyor belt. Such a conveyed material may preferably be a bulk product.

The pouch conveyor belt according to the invention is characterized in that the conveyor belt body comprises at least one sensor element which is configured to detect at least the temperature of the conveyor belt body at the location of the sensor element. The sensor element is described in more detail below.

The sensor element is preferably arranged in or on the conveyor belt body at the point where particularly high temperatures may occur, e.g. due to pressure loading of the material of the pouch conveyor belt. In this way, a maximal temperature of the pouch conveyor belt may be detected. The temperature may here be detected as a continuous value or at discrete times. Also, a current temperature value or the development of a temperature may be considered.

Knowledge of the temperature may be used according to the invention to be able to operate a pouch conveyor belt system, in which the pouch conveyor belt according to the invention may be used, depending on the detected temperature of the pouch conveyor belt such that a rise in the temperature of the pouch conveyor belt can be avoided or at least reduced. This is explained in more detail below.

According to one aspect of the present invention, the conveyor belt body comprises a first conveyor belt edge and a second conveyor belt edge, wherein at least one sensor element is arranged in the first conveyor belt edge and/or in the second conveyor belt edge. In this way, the temperature can be detected via the sensor element or elements where possible at the site at which the greatest pressure loads can act on the pouch conveyor belt in operation, and hence the greatest pressure-induced temperature rise is expected.

According to a further aspect of the present invention, the conveyor belt body comprises an elastomer material or consists of an elastomer material in which, at least in portions, a rigidity member and/or a tension member is embedded in the region of the first conveyor belt edge and/or the second conveyor belt edge, wherein at least one sensor element is arranged between the rigidity member and/or between the tension member and an outside of the conveyor belt edge which is designed to face a roller of a pouch conveyor belt system. With this arrangement, the temperature can be detected via the sensor element where possible at the site at which the greatest pressure loads can act on the pouch conveyor belt in operation, and hence the greatest pressure-induced temperature rise is expected. This may be the case precisely in this region of the conveyor belt edge, because in operation this region may be pressurized by the roller in the transverse direction. This may be achieved firstly by lateral pressure on the unprofiled side of the upper conveyor belt edge by a roller. Secondly, a sloping side of the profiling of the lower conveyor belt edge may lie on a roller so that a pressure may be exerted by the weight.

Preferably, as a rigidity member of a conveyor belt edge, a woven fabric may be used so that the forces can be transmitted superficially over the fabric, so that pressure loads on the elastomer material can be distributed superficially more evenly and thereby reduced, which may extend the service life of the conveyor belt edge.

In particular, enclosed steel cables, which extend in the running direction and receive the tensile forces of the pouch conveyor belt, may be used as a tension member.

According to a further aspect of the present invention, the first conveyor belt edge and/or the second conveyor belt edge has a profile which is configured for guiding between the rollers of a pouch conveyor belt system, wherein at least one sensor element is arranged in the first conveyor belt edge and/or in the second conveyor belt edge at the height of the profile. With this arrangement, the temperature may be detected via the sensor element where possible at the site at which the greatest pressure loads can act on the pouch conveyor belt in operation, and hence the greatest pressure-induced temperature rise is expected. This is because in operation, the profiles are compressed by the rollers of the pouch conveyor belt system, and thus higher temperatures may occur in the region of the profiles than in the remaining pouch conveyor belt (walking work).

This applies in particular if a tension member of a conveyor belt edge of the pouch conveyor belt, such as e.g. a steel cable for transmitting tensile forces in the movement direction of the pouch conveyor belt, is arranged centrally height-wise within the profile so that the sensor element may be arranged in the transverse direction between the tension member and a roller of the pouch conveyor belt system. Since the material of the conveyor belt edge may be comparatively greatly compressed between the tension member and the roller, here the greatest temperature development may occur and be detected by the sensor element.

According to a further aspect of the present invention, the conveyor belt body comprises a plurality of sensor elements which are spaced preferably evenly from each other in the movement direction of the pouch conveyor belt. The temperature of the pouch conveyor belt may thus be detected by sensors at several locations. This can allow conclusions about the temperatures at these locations on the pouch conveyor belt. Furthermore, a pouch conveyor belt system may be adjusted more rapidly to the temperature of the pouch conveyor belt because the temperature may thereby be detected more frequently, because e.g. sensor elements of the passing pouch conveyor belt can be detected at the same location on the pouch conveyor belt system at shorter time intervals.

According to an aspect of the present invention, the sensor element comprises or is formed as a transponder chip, preferably an RFID transponder chip, wherein the transponder chip is configured to receive data wirelessly from a transmitter unit of a pouch conveyor belt system and/or transmit data wirelessly to a receiver unit of a pouch conveyor belt system. In this way, a wireless data transmission may take place in one direction or preferably in both directions, in order to receive the temperature of the sensor element as data wirelessly from the sensor element, so that there is no need for disruptive cabling between the pouch conveyor belt system and the moving pouch conveyor belt. Data transmission to the sensor element enables the latter to be actuated by commands and e.g. asked to transmit temperature data.

According to a further aspect of the present invention, the sensor element is configured to receive electrical energy wirelessly from an energy transfer unit of a pouch conveyor belt system, and/or the sensor element has a preferably chargeable electrical energy store, and/or the sensor element is configured to generate electrical energy preferably piezoelectrically. In each of these ways, which may be used individually or combined with each other, the energy may be supplied to the sensor element so that the sensor element can exercise its function.

According to a further aspect of the present invention, the conveyor belt body comprises, at least in portions, a textile rigidity member, preferably a woven textile rigidity member, at least in the region of at least one sensor element, and the sensor element has a sensor antenna, preferably a transponder antenna, which at least in portions is connected to, preferably woven into, the textile rigidity member. In this way, the sensor antenna may be positioned in a defined fashion. This positioning of the sensor antenna may also be retained during production and in operation, even under pressure loads and/or elastic deformation of the material of the conveyor belt body. This also applies to the orientation of the sensor antenna which may have an influence on the signal reception or signal transmission of the sensor antenna.

According to a further aspect of the present invention, the sensor element is furthermore configured to detect the pressure of the conveyor belt body at the location of the sensor element. In this way, this information may also be detected and used for operation of the pouch conveyor belt system in which a pouch conveyor belt according to the invention is used. An incorrectly set pressure of a roller may thereby be detected, or the pressure detected by the sensor may be used to regulate instead of control the pressure of a roller.

According to a further aspect of the present invention, the sensor element furthermore comprises an identification coding which may be detected wirelessly by a conveyor belt system, preferably wirelessly by a receiver unit of a conveyor belt system. In this way, the detected temperature may be assigned to a specific sensor element which can be clearly identified by its identification coding. If the position of this sensor element over the length of the pouch conveyor belt is known, the detected temperature may thereby be unambiguously assigned to a concrete position of the pouch conveyor belt.

According to a further aspect of the present invention, the conveyor belt body comprises a plurality of sensor elements which are spaced preferably evenly from each other in the movement direction of the pouch conveyor belt, wherein each sensor element comprises an identification coding which may be detected wirelessly by a pouch conveyor belt system, preferably wirelessly by a receiver unit of a pouch conveyor belt system. In this way, the temperatures of the conveyor belt body may be detected by sensors at several locations along the pouch conveyor belt and clearly assigned to the locations.

The present invention also concerns a pouch conveyor belt system with a plurality of rollers for guiding a pouch conveyor belt as described above, with at least one transmitter unit which is configured to transmit data wirelessly to at least one sensor element of the pouch conveyor belt, and/or at least one receiver unit which is configured to receive data wirelessly from at least one sensor element of the pouch conveyor belt, wherein the pouch conveyor belt system preferably comprises a combined transmitter/receiver unit. In this way, the properties and advantages described above may be applied to a pouch conveyor belt system.

According to one aspect of the present invention, the pouch conveyor belt system furthermore comprises at least one energy transfer unit which is configured to transfer electrical energy wirelessly to at least one sensor element of the pouch conveyor belt. In this way, the aspect described above may be applied to a pouch conveyor belt system.

According to a further aspect of the present invention, the pouch conveyor belt system furthermore comprises a plurality of transmitter units, receiver units, transmitter/receiver units and/or energy transfer units which are arranged spaced from each other in the conveying direction. In this way, the aspect described above may be applied to a pouch conveyor belt system.

According to a further aspect of the present invention, at least one roller, preferably a plurality of rollers, comprises a roller tensioning unit which is configured to move at least one roller relative to the pouch conveyor belt in a movement direction of the roller tensioning unit and thus press on the pouch conveyor belt, wherein the pouch conveyor belt system is configured to control and/or regulate the pressure of the roller tensioning unit on the pouch conveyor belt depending on a temperature and/or depending on a pressure and/or depending on an identification coding of a sensor element or a plurality of sensor elements of the pouch conveyor belt. In this way, these parameters may be used individually or in combination with each other, or together with further information, to control and/or regulate the pressure which is exerted by at least one roller on the pouch conveyor belt or its conveyor belt edges during operation. If several rollers of the pouch conveyor belt system are controlled and/or regulated in this fashion, these rollers may be operated in the same way or in different ways.

According to the invention, individual aspects of a pouch conveyor belt and a pouch conveyor belt system described above may be used to operate the pouch conveyor belt or pouch conveyor belt system such that a temperature rise of the pouch conveyor belt can be avoided or at least reduced. This may be achieved for example by a temperature-dependent and in some cases also pressure-dependent setting of operating parameters of the pouch conveyor belt system, such as e.g. the spacing of the rollers from the conveyor belt edges or the pressure of the rollers on the conveyor belt edges. Also for example, the drive speed of the pouch conveyor belt may be adjusted accordingly, alternatively or additionally, as an operating parameter.

In this way, the maximal temperature may be limited and the reaching of critical temperatures avoided. Also in this way, a gentle run-up of a "cold" pouch conveyor belt to a desired operating temperature may be carried out such that a slower heating than previously known can be achieved. In both cases, the material of the pouch conveyor belt and in particular the conveyor belt edges may thereby be protected so that wear and/or ageing may be reduced. Failures may thereby be avoided.

Figure 2:
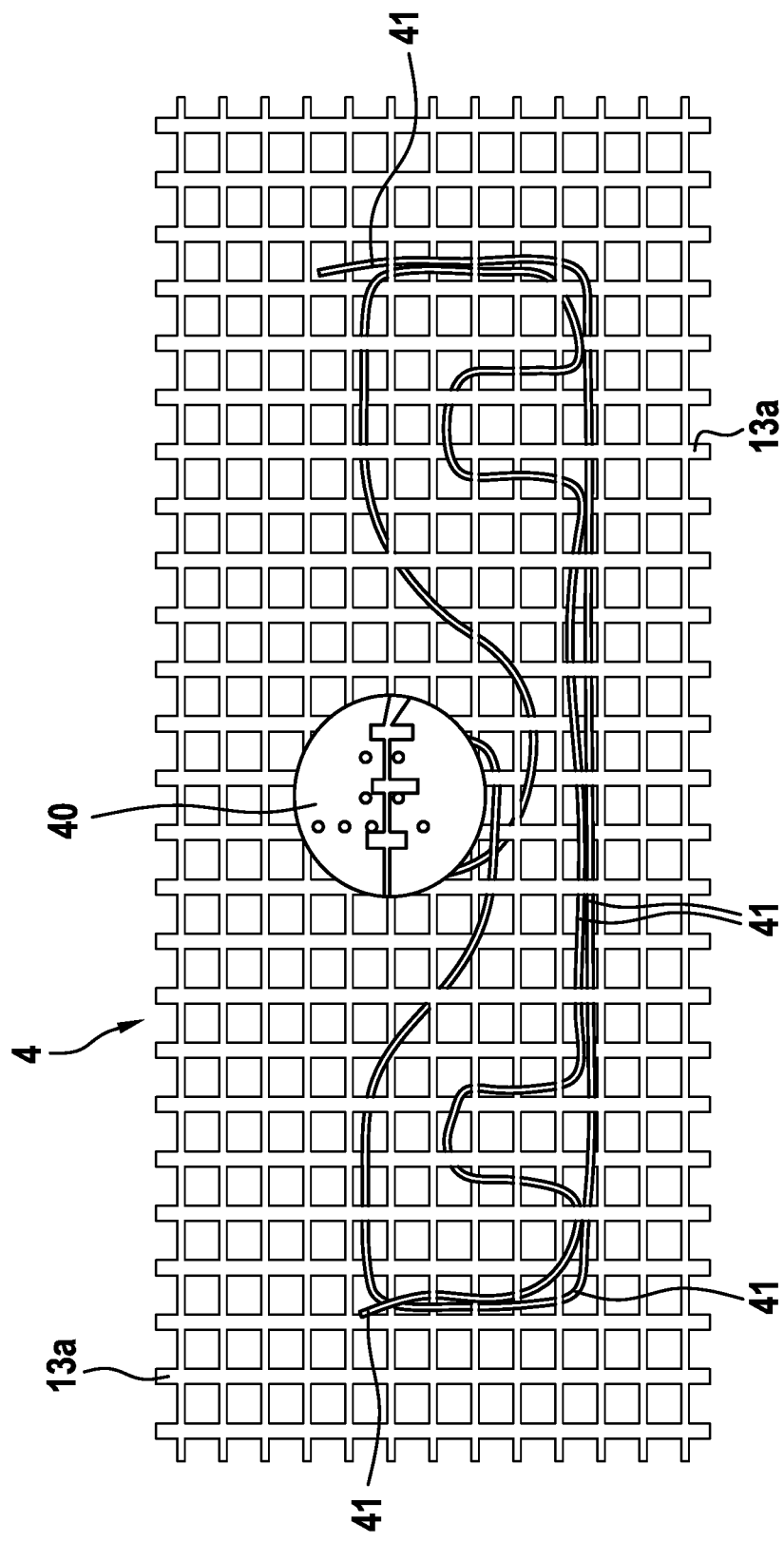
FIG. 2 shows a schematic plan view of a sensor element according to the invention with a rigidity member of a pouch conveyor belt according to the invention.
Figure 3:
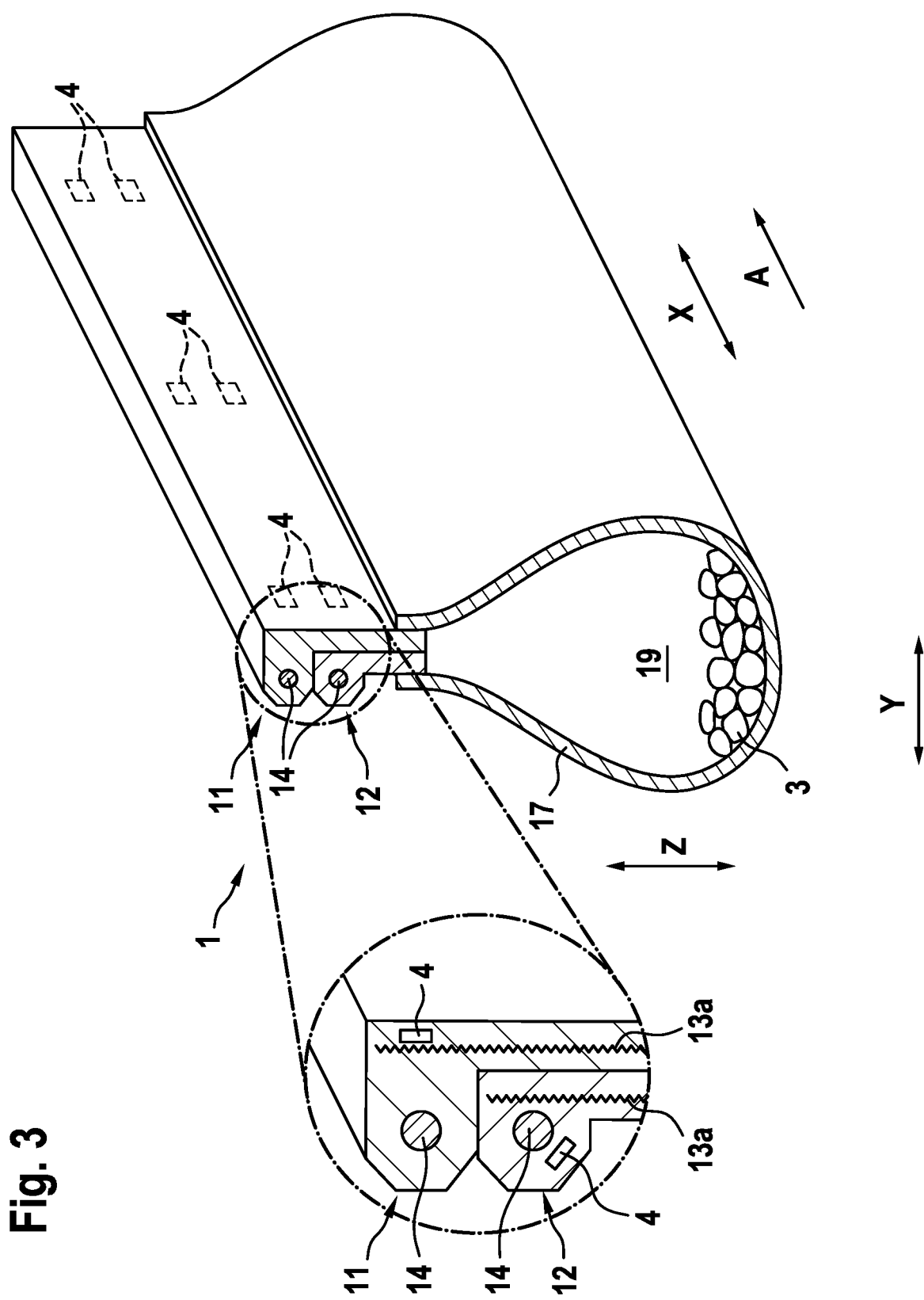
FIG. 3 shows a perspective, diagrammatic, cross-sectional depiction of a pouch conveyor belt system according to the invention with the pouch conveyor belt according to the invention.
Figure 4:
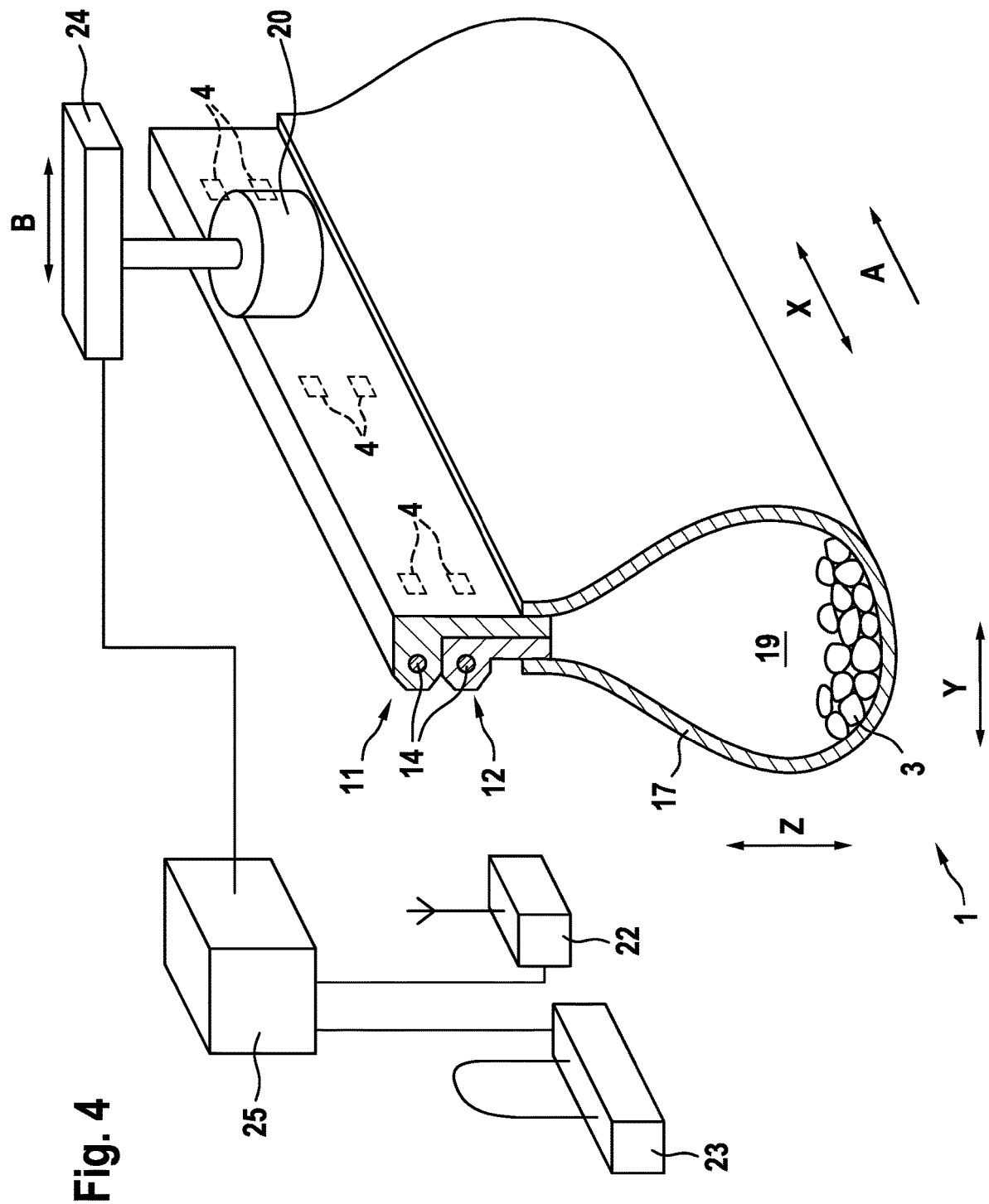
FIG. 4 shows a further perspective, diagrammatic, cross-sectional depiction of the pouch conveyor belt system according to the invention with the pouch conveyor belt according to the invention.

An exemplary embodiment and further advantages of the invention will be discussed below in conjunction with the following figures, in which:

FIG. 1 shows a perspective, diagrammatic, cross-sectional depiction of a known pouch conveyor belt system with a known pouch conveyor belt;

FIG. 2 shows a schematic plan view of a sensor element according to the invention with a rigidity member of a pouch conveyor belt according to the invention;

FIG. 3 shows a perspective, diagrammatic, cross-sectional depiction of a pouch conveyor belt system according to the invention with the pouch conveyor belt according to the invention; and FIG. 4 shows a further perspective, diagrammatic, cross-sectional depiction of the pouch conveyor belt system according to the invention with the pouch conveyor belt according to the invention.

The description of the abovementioned figures is given in Cartesian coordinates with a longitudinal direction X, a transverse direction Y oriented perpendicularly to the longitudinal direction X, and a vertical direction Z oriented perpendicularly both to the longitudinal direction X and also to the transverse direction Y. The longitudinal direction X can also be referred to as the depth direction X, the transverse direction Y as the width direction Y, and the vertical direction Z as the height direction Z.

FIG. 1 shows a known pouch conveyor belt 1 in a known pouch conveyor belt system 2. The pouch conveyor belt 1 has a conveyor belt body 10 which could also be described as a pouch 10 or a bag 10, and is made of an elastomer material. On the outside in the transverse direction Y, the conveyor belt body 10 has a first conveyor belt edge 11 and a second conveyor belt edge 12, which are arranged one above the other in the closed state of the pouch conveyor belt 1, so that the first conveyor belt edge 11 may be called the upper conveyor belt edge 11, and the second conveyor belt edge 12 may be called the lower conveyor belt edge 12. The two conveyor belt edges 11, 12 have a profile 13 which serves for holding by correspondingly arranged rollers 20 of the pouch conveyor belt system 2. A steel cable 14 is enclosed within each conveyor belt edge 11, 12 and runs in the longitudinal direction X as a tension member 14.

The two conveyor belt edges 11, 12 transform downward into respective contact regions 15, 16 which may also be called tabs 15, 16. A pouch body 17 is connected on each side to the contact regions 15, 16, and a conveying material 3 such as e.g. a bulk product 3 may be received on its top side as a carrying side 18. In the closed state, the carrying side 18 of the pouch body 17 surrounds the conveying material 3 in the transverse direction Y and in the height direction Z, so that the carrying side 18 may then be described as the inside 18 which encloses an interior 19 of the pouch conveyor belt 1.

The corresponding pouch conveyor belt system 2, as already stated, comprises rollers 20 arranged in pairs on system parts 21 in order to hold the first upper conveyor belt edge 11 superficially in the transverse direction Y and the second lower conveyor belt edge 12 on the profile 13 from obliquely below. The mutual spacing of the two rollers 20 or their spacing from the conveyor belt edges 11, 12 is selected such that the pouch conveyor belt 1 can move in the movement direction A along the longitudinal direction X, and at the same time the conveyor belt edges 11, 12 can be securely held and guided when passing through the pair of rollers 20.

Since, in known pouch conveyor belts 1 and known pouch conveyor belt systems 2, because of the pressure of the rollers 20 on the conveyor belt edges 11, 12, temperatures can occur which may be disadvantageous for the pouch conveyor belt 1, according to the invention it is proposed that the temperature, in particular of the conveyor belt edges 11, 12 of the pouch conveyor belt 1, is detected and taken into account in operation of the pouch conveyor belt system 1 as follows:

A woven textile layer 13a is enclosed as a rigidity member 13a in each of the conveyor belt edges 11, 12 in the longitudinal direction X and arranged in portions in the height Z, see FIG. 3, so that forces in the transverse direction Y can be better absorbed. A sensor element 4 is connected to this rigidity member 13a of the first upper conveyor belt edge 11, so that the sensor element 4 is arranged at the height Z of the tension member 4 in the transverse direction Y between the rigidity member 13a and the contact face of the conveyor belt edge 11, 12 facing the roller 20 rotating about the vertical direction Z. A further sensor element 4 is arranged in the second lower conveyor belt edge 12 at the point where the profile 13 is held by a roller 20 from obliquely below. This sensor element 4 is arranged between this contact face and the tension member 14 of the lower conveyor belt edge 12.

Thus a temperature can be detected precisely at the point where the greatest pressure is exerted on the conveyor belt edge 11, 12, and thereby the highest temperature may be caused. In this way, according to the invention the temperature may be detected in both conveyor belt edges 11, 12 and taken into account in operation of the pouch conveyor belt 1 or pouch conveyor belt system 2.

In order to securely define the positioning and in particular the orientation of the sensor element 4, and retain this both within the vulcanization process and during operation, a sensor antenna 41 of the sensor element 4 is configured as an elongate thread and woven multiple times into the rigidity member 13a formed as a woven fabric, see FIG. 2. The sensor antenna 41 is connected to a sensor body 40 which comprises all electronic and sensor components of the sensor element 4 and may therefore be described as the sensor electronics 40. The sensor electronics 40 are configured as an RFID transponder chip so that data, such as for example commands, can be received wirelessly from outside and data, such as temperature measurement values, can be transmitted wirelessly towards the outside. The sensor element 4 comprises as sensors, as well as a temperature sensor, a pressure sensor which is configured and arranged, in particular oriented, to detect a pressure in the transverse direction Y. The sensor element 4 furthermore comprises a unique identification coding which may also be transmitted as data wirelessly towards the outside.

Several sensor elements 4 are arranged inside the conveyor belt edges 11, 12 in pairs, evenly distributed in the longitudinal direction X, see FIGS. 3 and 4, so that the temperature and pressure at several locations can be detected and taken into account.

In order to obtain these temperature, pressure and identification coding data initially and then be able to take them into account, the pouch conveyor belt system 2 according to the invention comprises at least one combined transmitter/receiver unit 22, which is arranged stationarily along the pouch conveyor belt 1 so that commands can be sent from the transmitter/receiver unit 22 to the sensor elements 4 of the passing pouch conveyor belt 1, and temperature, pressure and identification coding data can be received from these. Furthermore, at least one energy transfer unit 23 is arranged stationarily along the pouch conveyor belt 1, by means of which electrical energy can be transferred e.g. by induction to the sensor elements 4 of the passing pouch conveyor belt 1.

These temperature, pressure and identification coding data may be transferred to a control unit 25 of the pouch conveyor belt system 2 in order to adjust at least one roller tensioning unit 24 in the movement direction B relative to the conveyor edges 11, 12 and thereby adjust the pressure on the conveyor edges 11, 12. In this way, the temperature rise in the conveyor edges 11, 12 may also be influenced. Here preferably, each roller 20 rotating about the vertical direction Z may be adjusted by means of its own roller tensioning unit 24, in order to apply these advantages to each pair of rollers 20.

LIST OF REFERENCE SYMBOLS (PART OF THE DESCRIPTION)

A Movement direction/conveying direction of pouch conveyor belt 1
B Movement direction of roller tensioning unit 24
X Longitudinal direction, depth
Y Transverse direction; width
Z Vertical direction; height
1 Pouch conveyor belt; SICON conveyor belt
10 Conveyor belt body; pouch; bag
11 First upper conveyor belt edge
12 Second lower conveyor belt edge
13 Profile of conveyor belt edges 11, 12
13a Rigidity member; textile fabric layer
14 Tension member; steel cables
15 Contact region/tab of first upper conveyor belt edge 11
16 Contact region/tab of second lower conveyor belt edge 12
17 Pouch body
18 Carrying side of pouch conveyor belt 1; inside of closed pouch conveyor belt 1
19 Interior of closed pouch conveyor belt 1
2 Pouch conveyor belt system
20 (Tensioning) roller
21 System parts
22 Data transmitter/receiver unit
23 Energy transfer unit
24 Roller tensioning unit
25 Control unit
3 Conveyed material; bulk product
4 Sensor element
40 Sensor body; sensor electronics; (RFID) transponder chip
41 Sensor antenna; transponder antenna

The invention claimed is:

1. A pouch conveyor belt comprising:
a conveyor belt body designed to receive a conveyed material in an interior of a closed pocket conveyor belt, where the conveyor belt body has a first conveyor belt edge and a second conveyor belt edge;
the conveyor belt body has at least one sensor element designed to detect at least a temperature of the conveyor belt body at the location of the sensor element,
the at least one sensor element is arranged in the first conveyor belt edge and/or in the second conveyor belt edge;
the conveyor belt body comprises an elastomeric material in which a strength member and/or a tension member is embedded at least in sections in a region of the first conveyor belt edge and/or a second region of the second conveyor belt edge;
the at least one sensor element being arranged between the strength member and/or between the tension member and an outer side of the first conveyor belt edge and/or the second conveyor belt edge and is designed to face a roller of a pocket conveyor belt installation; and a control unit configured to control the pressure of the roller tensioning unit on the pouch conveyor belt depending on a pressure from the at least one sensor element.

2. The pouch conveyor belt of claim 1, wherein
the first conveyor belt edge and/or the second conveyor belt edge has a profile which is configured for guiding between the rollers of a pouch conveyor belt system, wherein at least one sensor element is arranged in the first conveyor belt edge and/or in the second conveyor belt edge at a height (Z) of the profile.

3. The pouch conveyor belt of claim 1, wherein
the at least one sensor element comprises a plurality of sensor elements spaced evenly from each other in the movement direction (A) of the pouch conveyor belt.

4. The pouch conveyor belt as claimed as in claim 1, wherein
the at least one sensor element comprises a transponder chip and the transponder chip is an RFID transponder chip; and
the transponder chip is configured to receive data wirelessly from a transmitter unit of a pouch conveyor belt system and/or transmit data wirelessly to a receiver unit of a pouch conveyor belt system.

5. The pouch conveyor belt of claim 1, wherein the at least one sensor element is configured to receive electrical energy wirelessly from an energy transfer unit of a pouch conveyor belt system.

6. The pouch conveyor belt of claim 1, wherein the at least one sensor element comprises a chargeable electrical energy store.

7. The pouch conveyor belt of claim 1, wherein the at least one sensor element is configured to generate electrical energy piezo-electrically.

8. The pouch conveyor belt of claim 1, wherein
the conveyor belt body comprises, at least in portions, a woven textile rigidity member at least in the region of at least one sensor element, and
the at least one sensor element has a transponder antenna, which at least in portions is woven into the textile rigidity member.

9. The pouch conveyor belt of claim 1, wherein
the at least one sensor element is further configured to detect the pressure of the conveyor belt body at the location of the sensor element.

10. The pouch conveyor belt of claim 1, wherein
the at least one sensor element further comprises an identification coding which can be detected wirelessly by a conveyor belt system wirelessly by a receiver unit of a conveyor belt system.

11. The pouch conveyor belt of claim 1, wherein
the conveyor belt body comprises a plurality of sensor elements which are spaced evenly from each other in the movement direction (A) of the pouch conveyor belt; and
wherein each sensor element comprises an identification coding which may be detected wirelessly by a pouch conveyor belt system wirelessly by a receiver unit of a pouch conveyor belt system.

12. The pouch conveyor belt of claim 1, further comprising one or more rollers that include a roller tensioning unit configured to move at least one roller relative to the pouch conveyor belt in a movement direction (B) of the roller tensioning unit and thus press on the pouch conveyor belt.

13. A pouch conveyor belt comprising:
a conveyor belt body designed to receive a conveyed material in an interior of a closed pocket conveyor belt, where the conveyor belt body has a first conveyor belt edge and a second conveyor belt edge;
the conveyor belt body has at least one sensor element designed to detect at least a temperature of the conveyor belt body at the location of the sensor element,
the at least one sensor element is arranged in the first conveyor belt edge and/or in the second conveyor belt edge;
the conveyor belt body comprises an elastomeric material in which a strength member and/or a tension member is embedded at least in sections in a region of the first conveyor belt edge and/or a second region of the second conveyor belt edge;
the at least one sensor element being arranged between the strength member and/or between the tension member and an outer side of the first conveyor belt edge and/or the second conveyor belt edge and is designed to face a roller of a pocket conveyor belt installation;
one or more rollers that include a roller tensioning unit configured to move at least one roller relative to the pouch conveyor belt in a movement direction (B) of the roller tensioning unit and thus press on the pouch conveyor belt; and
a control unit configured to control and/or regulate the pressure of the roller tensioning unit on the pouch conveyor belt depending on a temperature and/or a pressure and/or an identification coding from the at least one sensor element.

14. The pouch conveyor belt of claim 13, the at least one sensor element further comprises the identification coding which can be detected wirelessly by a conveyor belt system wirelessly by a receiver unit of a conveyor belt system.

15. The pouch conveyor belt of claim 13, the conveyor belt body comprises a plurality of sensor elements which are spaced evenly from each other in the movement direction (A) of the pouch conveyor belt; and
wherein each sensor element comprises the identification coding which may be detected wirelessly by a pouch conveyor belt system wirelessly by a receiver unit of a pouch conveyor belt system.

16. A pouch conveyor belt comprising:
a conveyor belt body designed to receive a conveyed material in an interior of a closed pocket conveyor belt, where the conveyor belt body has a first conveyor belt edge and a second conveyor belt edge;
the conveyor belt body has at least one sensor element designed to detect at least a temperature of the conveyor belt body at the location of the sensor element,
the at least one sensor element is arranged in the first conveyor belt edge and/or in the second conveyor belt edge;
the conveyor belt body comprises an elastomeric material in which a strength member and/or a tension member is embedded at least in sections in a region of the first conveyor belt edge and/or a second region of the second conveyor belt edge;
the at least one sensor element being arranged between the strength member and/or between the tension member and an outer side of the first conveyor belt edge and/or the second conveyor belt edge and is designed to face a roller of a pocket conveyor belt installation; and
a control unit configured to control and/or regulate the pressure of the roller tensioning unit on the pouch conveyor belt depending on an identification coding from the at least one sensor element.

17. The pouch conveyor belt of claim 16, the at least one sensor element further comprises the identification coding which can be detected wirelessly by a conveyor belt system wirelessly by a receiver unit of a conveyor belt system.

18. The pouch conveyor belt of claim 16, wherein
   the first conveyor belt edge and/or the second conveyor belt edge has a profile which is configured for guiding between the rollers of a pouch conveyor belt system,
   wherein at least one sensor element is arranged in the first conveyor belt edge and/or in the second conveyor belt edge at a height (Z) of the profile.

19. The pouch conveyor belt as claimed as in claim 16, wherein
   the at least one sensor element comprises a transponder chip and the transponder chip is an RFID transponder chip; and
   the transponder chip is configured to receive data wirelessly from a transmitter unit of a pouch conveyor belt system and/or transmit data wirelessly to a receiver unit of a pouch conveyor belt system.

20. The pouch conveyor belt of claim 16, wherein the at least one sensor element is configured to receive electrical energy wirelessly from an energy transfer unit of a pouch conveyor belt system.

* * * * *